US008126066B2

(12) United States Patent
Osseiran et al.

(10) Patent No.: US 8,126,066 B2
(45) Date of Patent: Feb. 28, 2012

(54) TIME AND FREQUENCY CHANNEL ESTIMATION

(75) Inventors: Afif Osseiran, Kista (SE); Andrew Logothetis, Beaconsfield (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 951 days.

(21) Appl. No.: 11/418,455

(22) Filed: May 5, 2006

(65) Prior Publication Data
US 2006/0280114 A1    Dec. 14, 2006

Related U.S. Application Data

(60) Provisional application No. 60/688,721, filed on Jun. 9, 2005.

(51) Int. Cl.
*H04L 27/28*    (2006.01)
(52) U.S. Cl. ........ 375/260; 375/259; 375/295; 375/300; 375/299; 375/267
(58) Field of Classification Search .................. 375/260, 375/259, 295, 300, 299, 267
See application file for complete search history.

(56) References Cited

U.S. PATENT DOCUMENTS
7,061,854 B2 *   6/2006   Tarokh et al. ................. 370/206
(Continued)

FOREIGN PATENT DOCUMENTS
JP    2005-513953    5/2004
(Continued)

OTHER PUBLICATIONS

International Search Report and Written Opinion mailed Nov. 11, 2006 in corresponding PCT Application PCT/SE2006/050133.

(Continued)

*Primary Examiner* — Kenneth Lam
(74) *Attorney, Agent, or Firm* — Nixon & Vanderhye P.C.

(57) ABSTRACT

A radio channel estimation technique is described for use in a OFDM-based radio communications system. A block of OFDM symbols is transmitted from multiple antennas over multiple sub-carrier frequencies. The block of OFDM symbols includes known pilot symbols as well as data symbols to be determined by a receiver. The pilot symbols are transmitted in a predetermined pattern at periodic times on periodic sub-carriers. A pilot channel estimate is determined for each pilot symbol in the received block of OFDM symbols. An N×M matrix of points corresponding to the received OFDM symbol block is formed. N is the number of sub-carriers and M is the number of OFDM symbols in the OFDM symbol block. The matrix is formed by inserting pilot channel estimates at predetermined positions in the N×M matrix according to the predetermined pilot pattern and inserting zeros in remaining positions in the N×M matrix. A two dimensional inverse Fourier transform of the N×M matrix is calculated resulting in multiple copies of a channel estimate in the time domain. One is selected, and a two dimensional Fourier transform of the selected channel estimate is calculated to obtain a channel estimate at each point in the OFDM block.

14 Claims, 9 Drawing Sheets

U.S. PATENT DOCUMENTS

| | | | |
|---|---|---|---|
| 7,221,645 B2 * | 5/2007 | Wang et al. | 370/203 |
| 7,301,890 B2 * | 11/2007 | Joo et al. | 370/208 |
| 7,356,090 B2 * | 4/2008 | Hwang et al. | 375/295 |
| 7,486,735 B2 * | 2/2009 | Dubuc et al. | 375/260 |
| 7,586,881 B2 * | 9/2009 | Hansen et al. | 370/334 |
| 2003/0218973 A1 * | 11/2003 | Oprea et al. | 370/210 |
| 2004/0086055 A1 | 5/2004 | Li | |
| 2005/0128966 A1 * | 6/2005 | Yee | 370/310 |
| 2005/0249181 A1 * | 11/2005 | Vijayan et al. | 370/344 |
| 2005/0254596 A1 * | 11/2005 | Naguib | 375/299 |
| 2006/0067421 A1 * | 3/2006 | Walton et al. | 375/267 |
| 2006/0205357 A1 * | 9/2006 | Kim | 375/260 |
| 2007/0263735 A1 * | 11/2007 | Tong et al. | 375/260 |
| 2008/0112495 A1 * | 5/2008 | Gore et al. | 375/260 |
| 2008/0253279 A1 * | 10/2008 | Ma et al. | 370/206 |

FOREIGN PATENT DOCUMENTS

| | | |
|---|---|---|
| WO | WO 03/056742 | 7/2003 |
| WO | WO 2004/073276 | 8/2004 |

OTHER PUBLICATIONS

Auer, "Channel Estimation for OFDM Systems with Multiple Transmit Antennas by Exploiting the Properties of the Discrete Fourier Transform", The 14th 2003 IEEE International Symposium on Personal, Indoor and Mobile Radio Communication Proceedings, vol. 2, Sep. 2003, pp. 1954-1958.

Li, "Pilot-Symbol-Aided Channel Estimation for OFDM in Wireless Systems", IEEE Transactions on Vehicular Technology, vol. 49, No. 4, Jul. 2000, pp. 1207-1215.

Li, "Simplified Channel Estimation for OFDM Systems with Multiple Transmit Antennas", IEEE Transactions on Wireless Communications, vol. 1, No. 1, Jan. 2002, pp. 67-75.

Cavers, "An Analysis of Pilot Symbol Assisted Modulation for Rayleigh Fading Channels", IEEE Transactions on Vehicular Technology, vol. 40, No. 4, Nov. 1991, pp. 686-693.

PCT Second Written Opinion of the International Preliminary Examining Authority mailed Jun. 25, 2007; 5 pages.

Translation of Chinese Official Action, Apr. 29, 2010 in corresponding Chinese Application No. 2006/80020322.6.

Japanese official action and summary of Japanese official action, Jun. 28, 2011, in corresponding Japanese Application No. JP 2008-515659.

Gunther Auer; "Channel Estimation for OFDM Sytems with Multiple Transmit Antennas by Filtering in Time and Frequency", Oct. 2003.

Ji-Woong Choi and Yong-Hwan Lee; "Optimum Pilot Pattern for Channel Estimation in OFDM Systems;" IEEE Transactions on Wireless Communications, vol. 4, No. 5; Sep. 2005; pp. 2083-2088.

Sinem Coleri, Mustafa Ergen, Anuj Puri, and Ahmad Bahai; "Channel Estimation Techniques Based on Pilot Arrangement in OFDM Systems;" IEEE Transactions on Broadcasting, vol. 48, No. 3; Sep. 2002; pp. 223-229.

Alan V. Oppenheim, Ronald W. Schafer with John R. Buck; "Discrete-Time Signal Processing;" Second Edition; Prentice Hall Signal Processing Series, Jan. 1999.

* cited by examiner

TIME AND FREQUENCY CHANNEL ESTIMATION

RELATED APPLICATION

This application claims priority from U.S. provisional patent application No. 60/688,721, filed on Jun. 9, 2005, the contents of which are incorporated here by reference.

TECHNICAL FIELD

The technical field relates to communications, and more particularly, to estimating a channel in time and in frequency.

BACKGROUND

Receivers often employ equalizers to compensate for signal distortion suffered during signal propagation over a channel. Most equalization methods include estimating the channel characteristics to determine how the channel is distorting a signal. One way to determine that distortion is to send over the channel a signal known by the receiver. The receiver compares the received signal with the known signal, and an estimate of the channel can be computed. One example of a known signal is a simple pulse. In that case, the received signal is called the channel impulse response and corresponds to the transfer function h of the channel. A more sophisticated known signal is a pilot signal that includes for example a known sequence of bits or symbols. The known pilot sequence is compared with the received sequence to determine how much and where the received signal differs from the known sequence. An equalizer can be viewed as filter of sorts that tries to remove the channel distortion from the received signal.

Orthogonal Frequency Domain Multiplexing (OFDM) pertains to a technology that transmits multiple signals simultaneously over a wired or wireless communication medium. Specifically, the data is distributed over a large number of sub-carriers spaced apart at precise frequencies. That spacing provides the orthogonality needed to facilitate demodulation of each frequency.

Wireless-based OFDM receivers may be employed to transmit multiple data streams over a number of parallel flat fading channels. Equalization may be performed in the frequency domain using one-tap digital filters. Channel estimation is performed using known pilot sequences. Pilot signals are transmitted at specific time slots and frequency sub-carriers known to the transmitter and the receiver. The channel at these pilot time slots and frequency sub-carriers may be estimated using pilot-assisted channel estimation techniques such as zero-forcing, minimum mean square error (MMSE), etc. The channel must also be estimated for the data transmitted at time slots and sub-carriers that are different from those on which pilots are sent. Channel estimation for the data may be determined using prediction methods like linear interpolation and MMSE interpolation.

Even though it is relatively easy to implement, linear interpolation often gives poor results in a frequency selective time-varying environment. In other words, between two points where the channel is estimated based on received pilot signals, the channel may change significantly (not uncommon in mobile radio environments). As a result, the interpolated channel estimates between the two pilots can be quite different from the actual channel at those points. Another drawback is a large mismatch in OFDM between the estimated channels and the true channels at the borders of the time-frequency grid.

Linear MMSE interpolation is based on a model that determines the variation of the channel in time and frequency. For example, the time variation in many cases follows the Jakes model (a model for Rayleigh fading based on summing sinusoids), and the frequency response can be determined using the power delay profile. The linear MMSE interpolation method may be quite satisfactory if the correct model is selected. But if there is a model mismatch, performance suffers. Another drawback of this linear MMSE interpolation is large memory requirements and computational complexity.

SUMMARY

A radio channel estimation technique is described for use in a OFDM-based radio communications system. A block of OFDM symbols is transmitted from multiple antennas. The block of OFDM symbols includes known pilot symbols as well as data symbols to be determined by a receiver. The pilot symbols are transmitted in a predetermined pattern at periodic times on periodic sub-carriers. A pilot channel estimate is determined for each pilot symbol in the received block of OFDM symbols. An $N \times M$ matrix of points corresponding to the received OFDM symbol block is formed. $N$ is the number of sub-carriers and $M$ is the number of OFDM symbols in the OFDM symbol block. The matrix is formed by inserting pilot channel estimates at predetermined positions in the $N \times M$ matrix according to the predetermined pilot pattern and inserting zeros in remaining positions in the $N \times M$ matrix. A two dimensional inverse Fourier transform of the $N \times M$ matrix is calculated resulting in multiple copies of a channel estimate in the time domain. One copy is selected, and a two dimensional Fourier transform of the selected channel estimate is calculated to obtain a channel estimate at each point in the OFDM block. Received OFDM data symbols are then equalized based on the obtained channel estimate.

To facilitate the radio channel estimation, the multiple antenna transmitter determines one or more known pilot symbols and a periodic pilot transmission pattern where the pilot symbols are placed at periodic times on periodic sub-carriers. A block of OFDM symbols is formed that includes the one or more pilot symbols and data symbols in accordance with a predetermined pattern. Certain ones of the OFDM symbols are assigned to corresponding ones the multiple antennas so that each antenna has an associated OFDM symbol stream. Each OFDM symbol stream is then transmitted from its corresponding antenna. The periodic pilot transmission pattern is preferably a symmetric pattern. But if not, the pilot transmission pattern may be transformed into a symmetric pattern where the pilot symbols are interspersed symmetrically with the data symbols in the OFDM symbol block.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), field programmable gate arrays, one or more digital signal processors (DSPs), etc.

Figure 1:
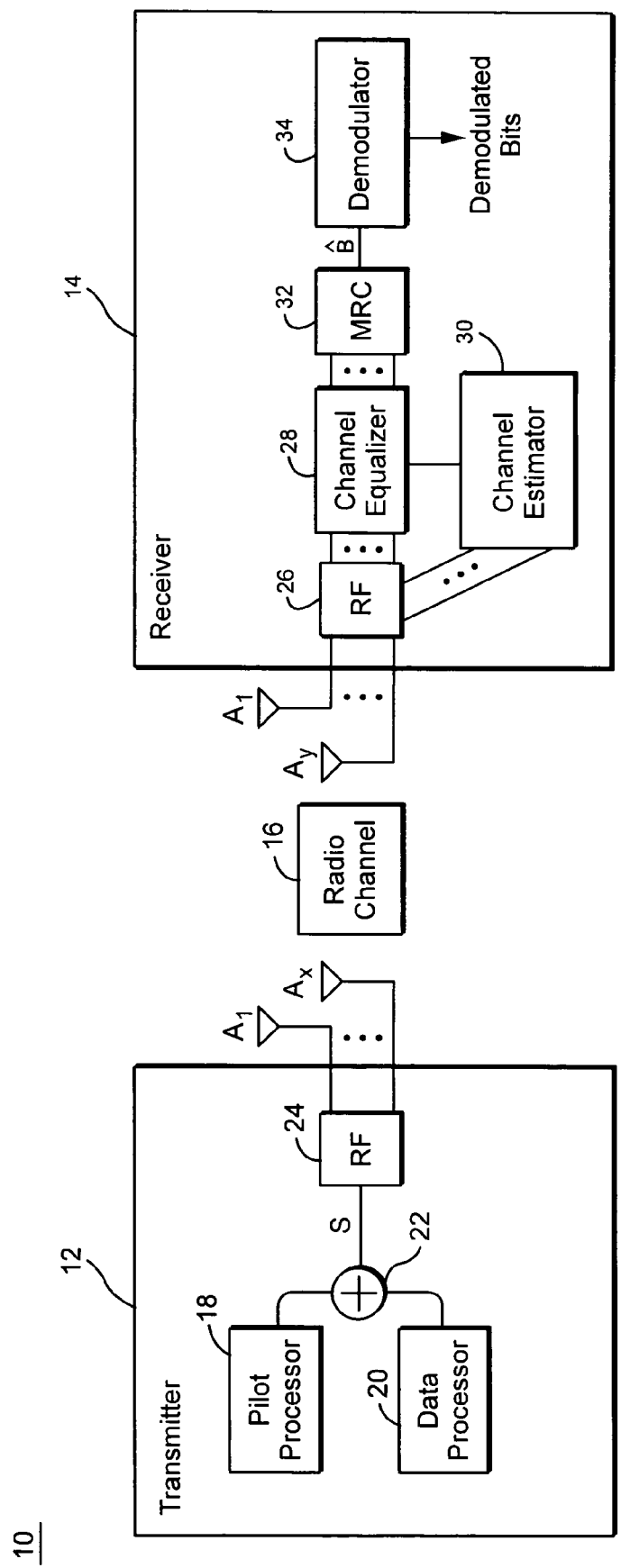
FIG. 1 is a diagram of an example OFDM radio communications system.

FIG. 1 shows an example of radio communications system 10 which can be based upon Orthogonal Frequency Domain Multiplexing (OFDM) an OFDM transmitter 12 includes a pilot processor 18 for providing one or more known pilot sequences to a combiner 22. The transmitter 12 includes multiple antennas $A_1, A_2 \ldots A_x$. Data processor 20 provides OFDM data symbols to the combiner 12 which are combined with OFDM pilot symbols in a predetermined pattern (described in more detail below). The combined signal is transformed and then processed in the radio frequency (RF) block 24 before transmission over a corresponding one of the antennas.

The antenna transmissions propagate over a radio channel 16 and are received at one or more antennas $A_1, A_2 \ldots A_y$ at an OFDM receiver 14. The antenna signals are processed in an RF block 26 and converted to baseband. The baseband signal is provided both to a channel equalizer 28 for equalization and a channel estimator 30 for estimating the radio channel 16 for a received OFDM block of symbols. The channel equalizer 28 compensates for distortion caused by the radio channel 16 using the estimated channel from the channel estimator 30. If the receiver 14 employs multiple receiving antennas, each antenna branch is separately processed to provide an equalized symbol stream, e.g., to a maximum ratio combiner (MRC) 32. The maximum ratio combiner 32 combines the symbol streams from each antenna typically providing a higher weighting to antenna symbol streams that have a better signal-to-interference ratio or some other quality measure. The combined symbol stream $\hat{B}$ is then provided to a demodulator 34, which demodulates the information on each OFDM sub-carrier to provide demodulated bits for further processing.

As described in the background, channel estimation may be performed for known pilot symbols using one or more known pilot signals and any one of well-known pilot-assisted channel estimation techniques. But the channel must also be estimated for the data symbols, which unlike the pilot symbols, are not known in advance by the receiver. Performing channel estimation for the unknown data symbols in the OFDM block using an interpolation technique is less than optimal for the reasons explained in the background. The inventors conceived of a better, more accurate, and simpler technique for estimating the channel for the data symbols based on the transmission of an OFDM block using a predetermined, periodic pilot transmission pattern.

Figure 2:
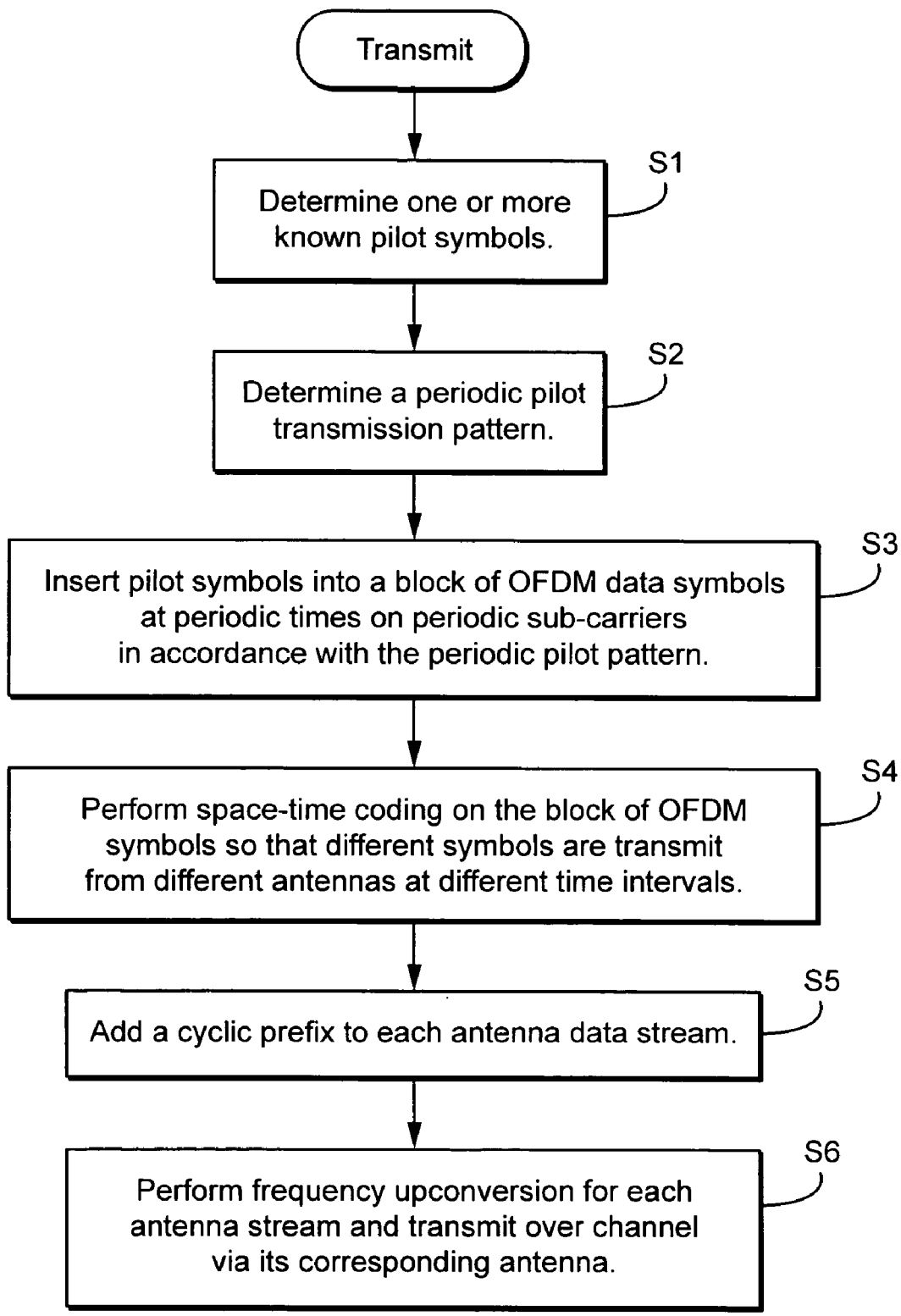
FIG. 2 is a flowchart showing transmitter procedures in accordance with one non-limiting example embodiment.
Figure 4:
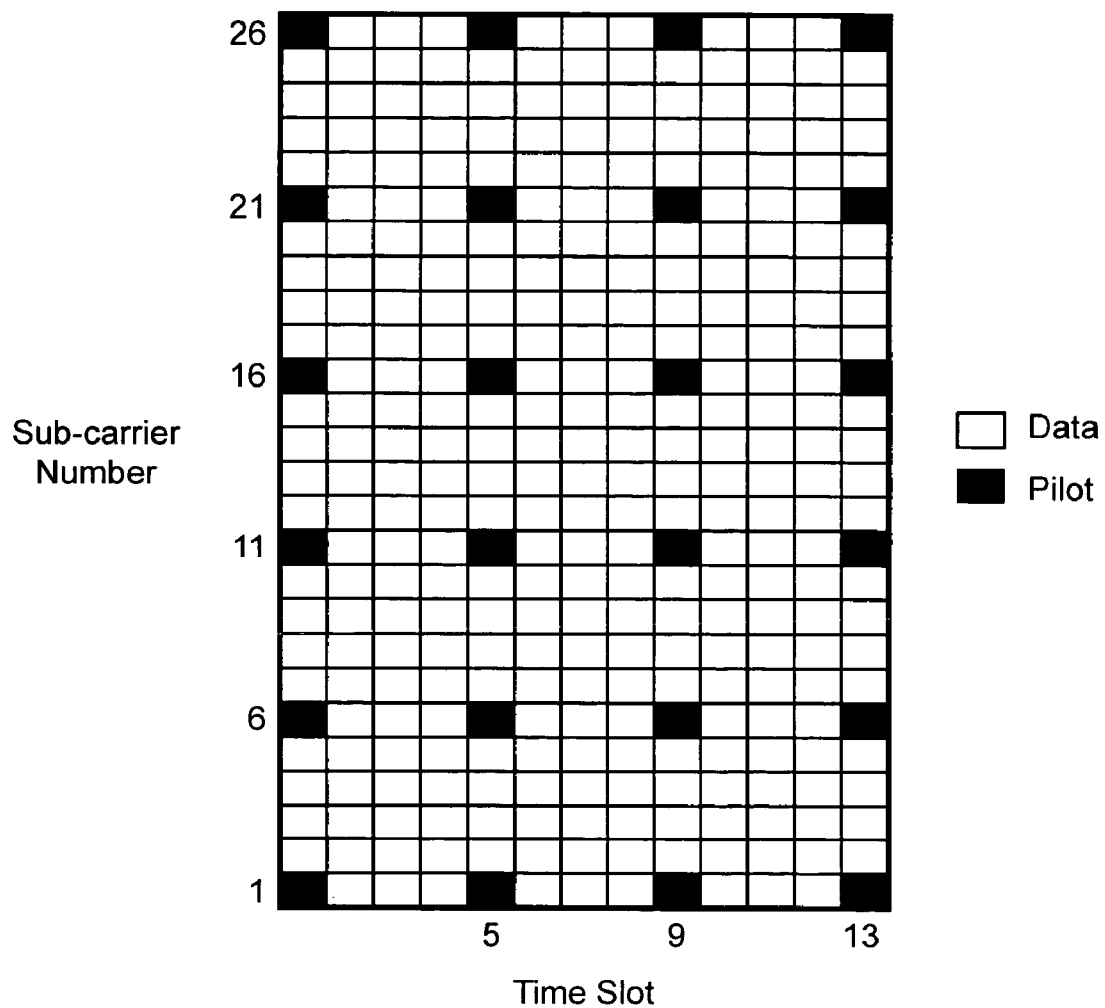
FIG. 4 is a graph showing a non-limiting example of a predetermined symmetric pilot pattern.

FIG. 2 illustrates example, non-limiting procedures in a "transmit" flowchart for setting up and transmitting such a periodic pilot transmission pattern. Initially, one or more known pilot symbols are determined in step S1. A periodic pilot transmission pattern is determined in step S2. FIG. 4 shows a non-limiting example predetermined pilot pattern for a block of OFDM symbols. Each vertical column associated with a time slot corresponds to a single OFDM symbol having 26 sub-carriers. Those skilled in the art will appreciate that the number of time slots and the number of sub-carriers can be any suitable number. The pilot symbols are positioned in the OFDM block so that they occur periodically both with respect to sub-carrier and with respect to time slot. In FIG. 4, a pilot is inserted every fifth sub-carrier and every fourth time slot. The number of pilots in the frequency and time direction depends on the maximum delay of the channel and the maximum Doppler frequency. The periodicity of the pilot in the time domain should at be at least twice faster than the Doppler frequency in order to satisfy the Nyquist criteria. In the frequency domain, the frequency separation between two pilots can be at most equal to the coherence bandwidth of the radio channel.

Returning to FIG. 2, the pilot symbols are inserted into a block of OFDM data symbols at periodic times on periodic sub-carriers in accordance with the periodic pilot pattern as just explained (step S3). Then, time-space coding is performed on the block of OFDM symbols so that different symbols are transmitted from different transmitter antennas at different time intervals (step S4). A cyclic prefix is added to each antenna data stream to reduce intersymbol interference at the receiver (step S5). The antenna data streams are frequency up-converted and transmitted over the radio channel via its corresponding antenna (step S6).

Figure 3:
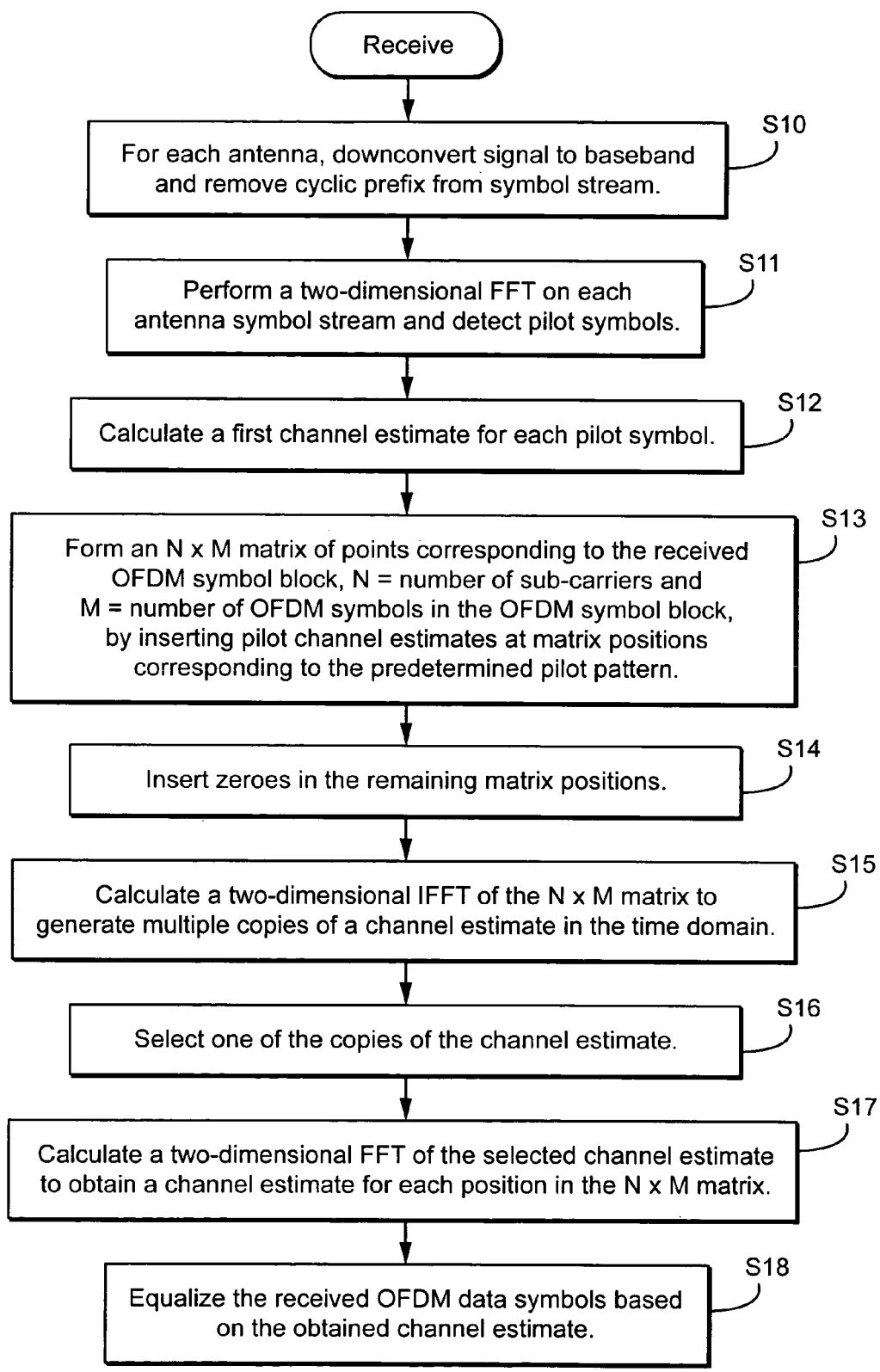
FIG. 3 is a flowchart showing receiver procedures in accordance with one non-limiting example embodiment.

FIG. 3 illustrates a "receive" flowchart outlining example, non-limiting steps that may be performed by the receiver 14. As explained earlier, the receiver may have one or several antennas. For each receive antenna, the received signal is down converted to baseband frequency and the cyclic prefix removed from the symbol stream (step S10). A two-dimensional Fourier transform (preferably a Fast Fourier Transform (FFT)) is performed on each antenna symbol stream, and the known pilot symbols are detected (step S11). A first channel estimate is calculated for each detected pilot symbol (step S12).

Processing circuitry in the receiver then forms an N×M matrix of points corresponding to the received OFDM symbol block, where N=the number of sub-carriers and M=the number of OFDM symbols in the OFDM block. The matrix is formed by inserting pilot channel estimates previously determined at matrix positions corresponding to the predetermined pilot pattern (step S13). Zeros are inserted in the remaining matrix positions which correspond to the as of yet unknown data symbols (step S14). A two dimensional inverse Fourier transform (preferably a two dimensional Inverse Fast Fourier Transform (IFFT)) of the N×M matrix to generate multiple copies of a channel estimate in the time domain for the just-received OFDM block of symbols (step S15). This produces multiple copies of the channel estimate. The number of copies corresponds to the number of zeros inserted between the pilot symbols in one time slots. In the FIG. 4 example, there are four zeros between each pilot in each OFDM symbol. Therefore, four copies of the channel estimate would be generated. One of the copies of this channel estimate is selected (step S16). The copy may be selected, for example, using a low pass filter. A two-dimensional FFT is then calculated for the selected channel estimate to obtain an actual channel estimate for each position in the N×M matrix (step S17). The received OFDM data symbols are then equalized based on the obtained channel estimates (step S18).

Figure 5:
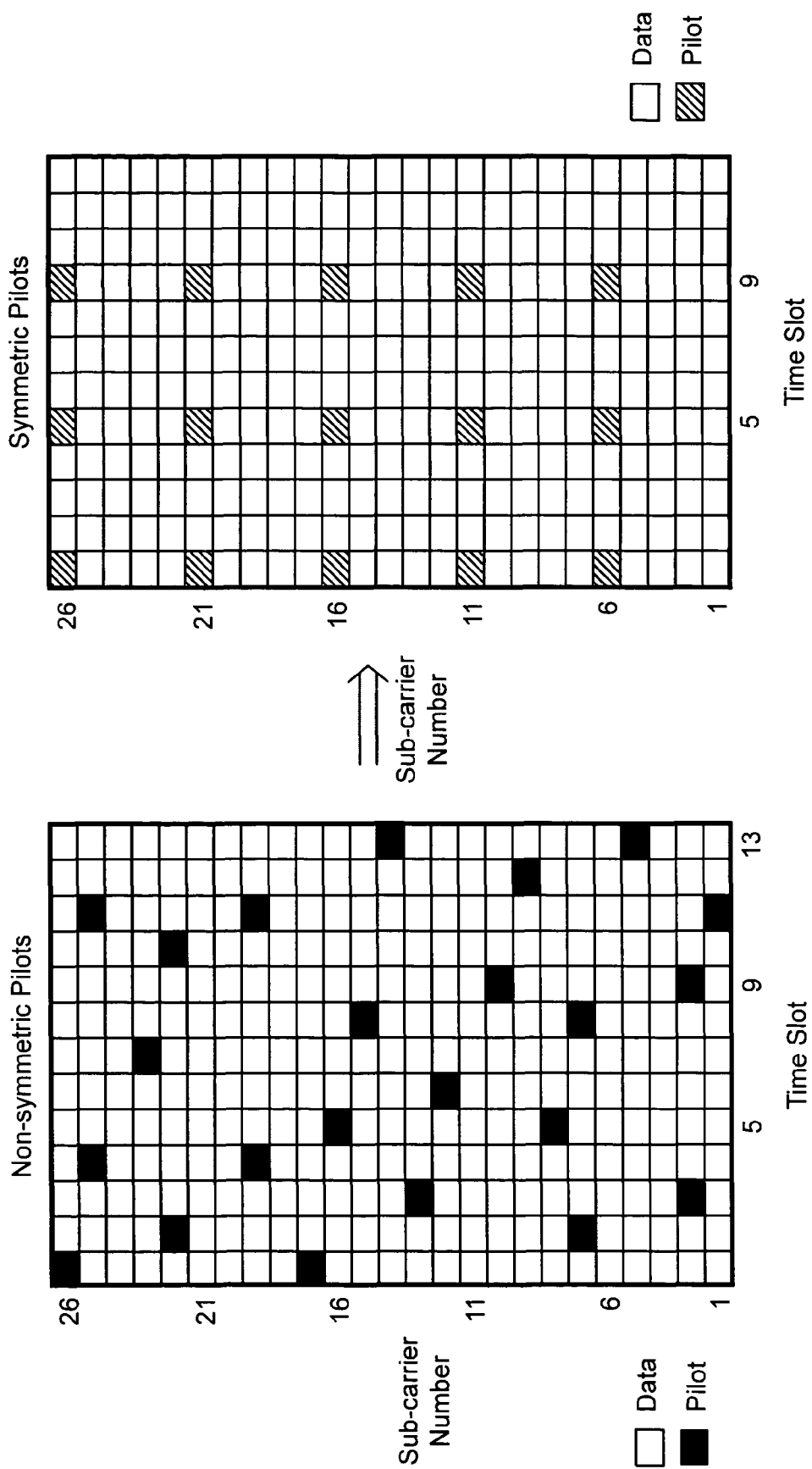
FIG. 5 shows a non-limiting example of transforming a non-symmetric pilot pattern into a symmetric pilot pattern.

As explained above, the predetermined pilot pattern for the OFDM block of symbols should be symmetric. A non-limiting example of a symmetric pilot pattern is shown in FIG. 4. But if the pilots are interspersed in a block of OFDM data non-symmetrically, that OFDM block of data should be transformed so that the pilot symbols are symmetrically and periodically positioned in the block. FIG. 5 illustrates on the right hand side an example of a block of OFDM symbols in which the pilots are interspersed non-symmetrically. That block of non-symmetric OFDM symbols is then transformed so that the pilot symbols are symmetrically and periodically spaced as shown on the left-side of the Figure. In order to obtain the channel estimates, the pilots should be located periodically in the time/frequency domain to perform the two-dimensional FFT/IFFT operations.

Figure 6:
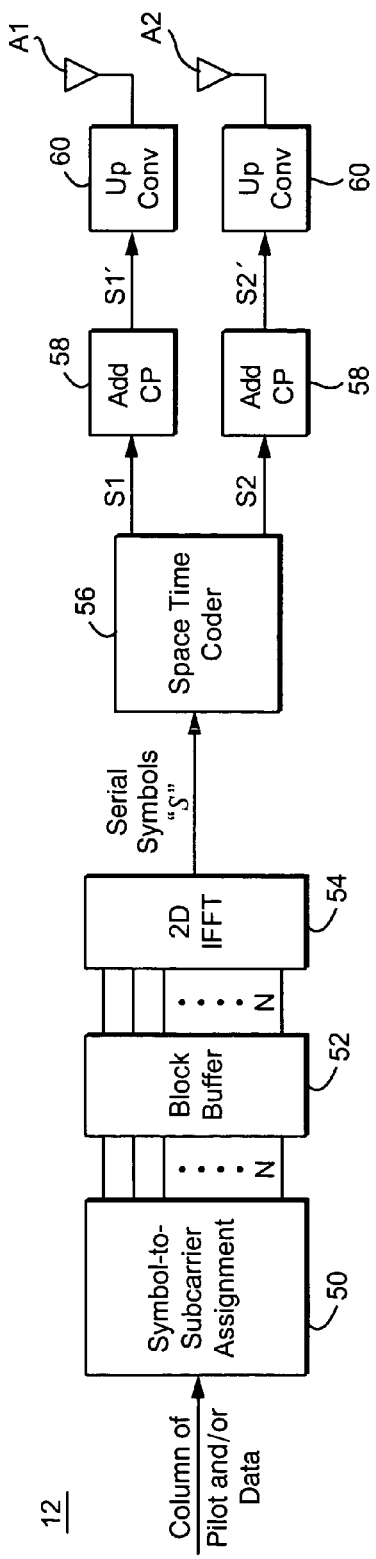
FIG. 6 is a function block diagram of a non-limiting example OFDM transmitter.

FIG. 6 shows one non-limiting example implementations for the transmitter 12. As explained above, for OFDM transmission, one OFDM symbol consists of N samples modulated onto corresponding ones of N sub-carriers. In the example shown in FIG. 4, one OFDM symbol corresponds to one column in the graph, where N equals, for example, 26. Each column may include 26 pilot and data symbols or more likely 26 symbol samples. Block 50 performs an OFDM symbol-to-sub-carrier assignment to generate N outputs. Each column of N outputs is then stored in block buffer 52. When a complete OFDM block has been stored in buffer 52, the OFDM block is then provided to a two dimensional inverse Fast Fourier Transformer 54. Transformer 54 generates a serial symbol stream S which is provided to space-time coder 56.

The space-time coder 56 determines which OFDM symbols are transmitted over a particular transmit antenna during a particular time slot. Consider a simplified example where one time slot corresponds to transmitting three OFDM symbols one, two, three. During a time slot, OFDM symbols one, two, and three are transmitted via the first antenna A1 in that order. During the same time slot, OFDM symbols are transmitted over antenna A2 in a different order two, three, and one. The sequence transmitted over antenna A2 is a cyclically shifted version of the sequence transmitted over antenna A1, where the shift is equal to one OFDM symbol. Similar to cyclic delay diversity, the cyclic shift applied on the transmitted data artificially modifies the radio channel while making the data sequence transparent at the receiver. Each antenna symbol stream S1 and S2 is provided to a respective add cyclic prefix block 58 which outputs a modified symbol of stream S1' and S2' to a frequency up converter block 60 for converting the baseband signal to radio frequency and transmission over the associated antenna A1 or A2.

Figure 7:
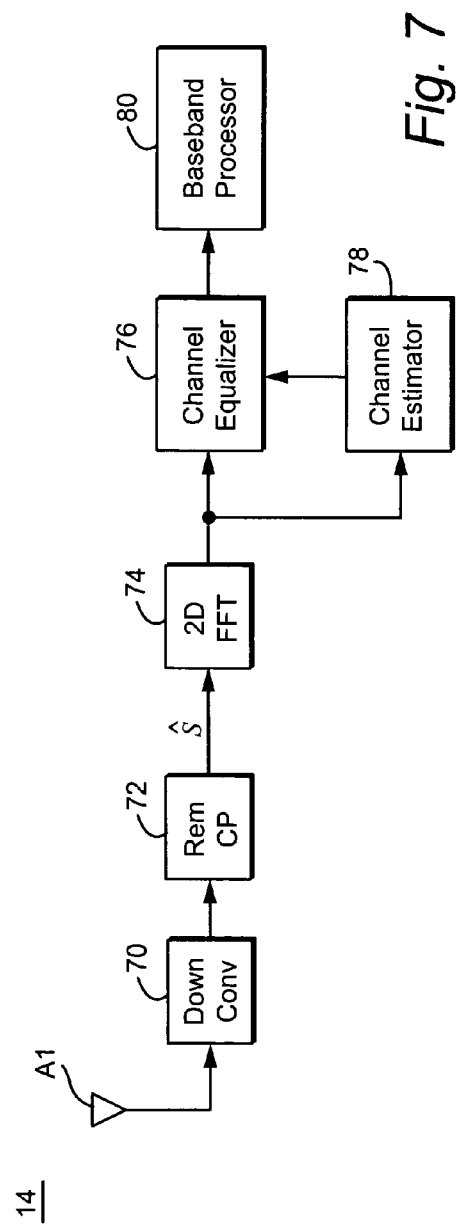
FIG. 7 is a function block diagram of a non-limiting example OFDM receiver.

FIG. 7 shows a non-limiting example receiver 14 that includes one antenna A1. The received signal is down-converted from RF to baseband in down-converter 70. The cyclic prefix is removed in block 72. Then an OFDM block of symbols of size N×M is formed. A two-dimensional Fast Fourier Transform 74 is applied to the OFDM block that is provided to a channel estimator 78. The channel estimator 78 performs the channel estimation procedures outlined, for example, in FIG. 3. The received OFDM data symbols are then equalized by channel equalizer 76 in accordance with the actual channel estimate. The equalized signal is then provided to baseband processor 80 for further baseband processing.

Figure 8:
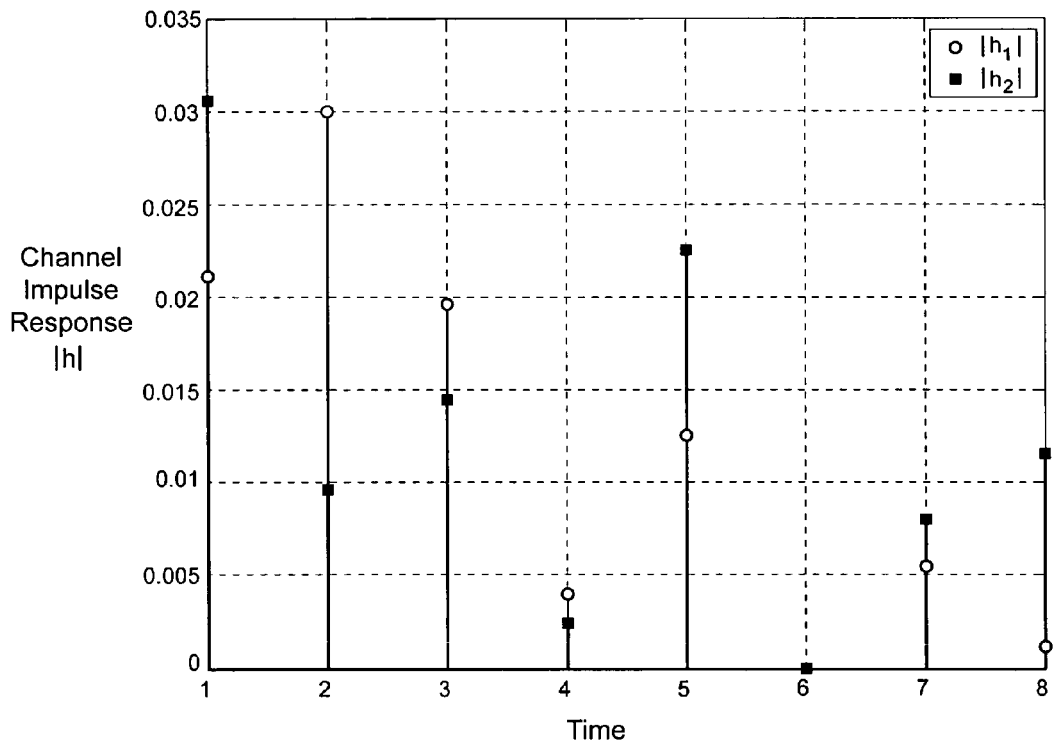
FIG. 8 is a two dimensional graph of a non-limiting example channel impulse response versus time for a two antenna transmitter.

An example channel estimation for a two antenna transmitter and a one antenna receiver is now explained in conjunction with the FIGS. 8-11. FIG. 8 illustrates the actual channel impulse response h for each of the two transmit antennas A1 and A2. For purposes of explanation and simplification, the channel impulse response can be viewed as corresponding to the channel estimate. The channel impulse response for antenna A1 is indicated with a circle, and the channel impulse response for antenna A2 is indicated with a square.

Figure 9:
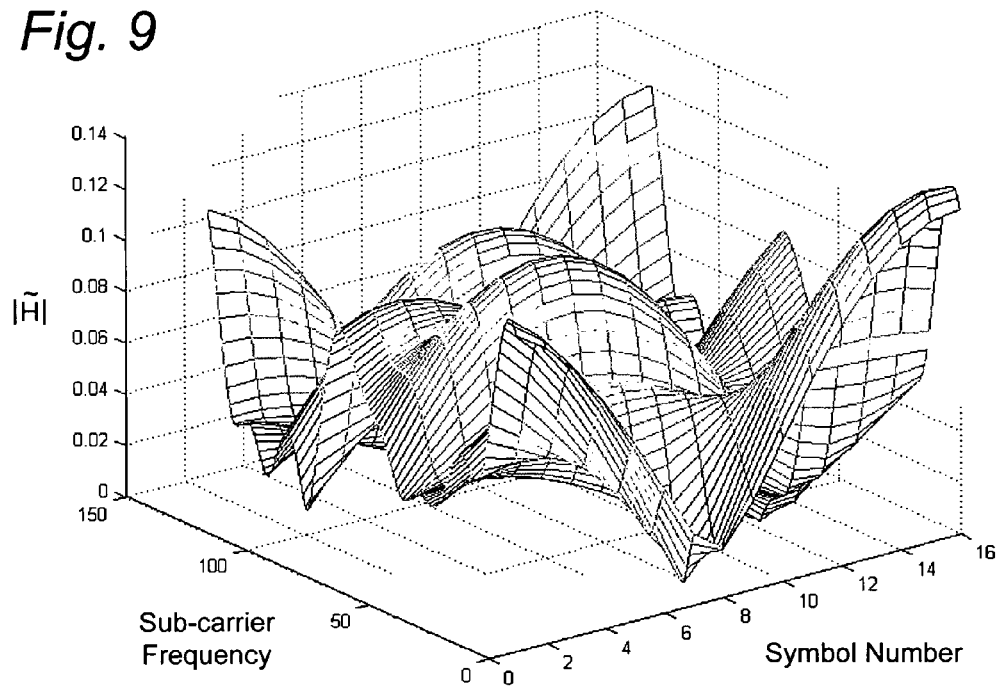
FIG. 9 is a three dimensional graph of a non-limiting example channel response graphed against sub-carrier frequency and OFDM symbol number (a two dimensional FFT domain) for a two antenna transmitter.
Figure 10:
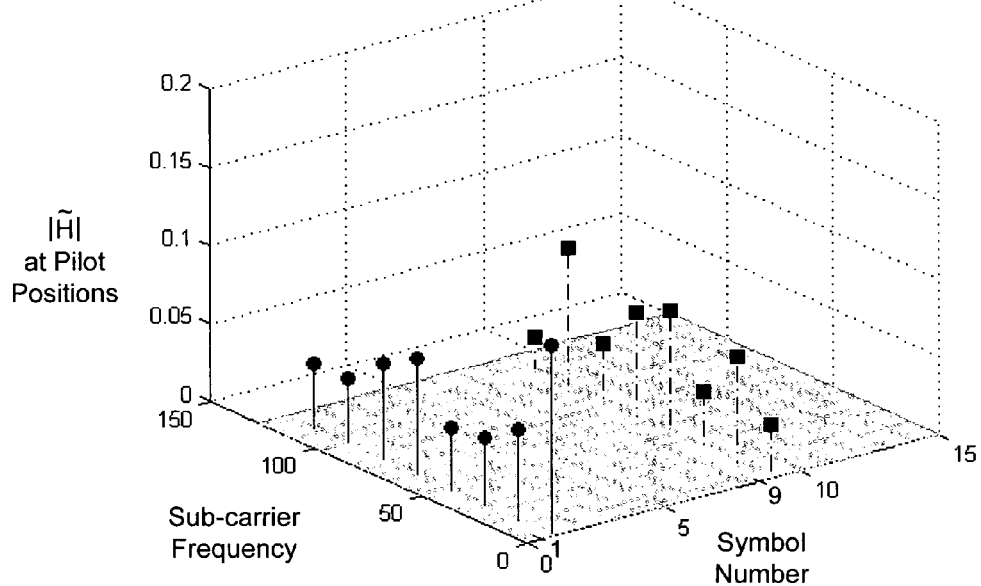
FIG. 10 is a three dimensional graph of a non-limiting example channel response for the known pilot symbols.

FIG. 9 illustrates the channel response in both the frequency and time domains for both antennas. The channel response must be shown in three dimensions to illustrate the multiple sub-carriers for each OFDM symbols as well as the multiple OFDM symbols in an OFDM block. FIG. 10 illustrates the channel response at the pilot symbol positions.

Recall from the example predetermined pilot pattern shown in FIG. 4 that certain symbol samples in each OFDM column symbol correspond to known pilot symbols. For example, FIG. 10 illustrates the channel response for individual pilot symbols—OFDM symbol No. 1 and OFDM symbol No. 9. The channel response at each pilot symbol can then be compared with the known pilot symbol to determine an estimate of the channel at that pilot position. Only the channel response values for the known pilot positions are maintained in the OFDM block because the channel responses are not known for the data symbol positions. As a result, zeros are inserted in these data positions by taking a two dimensional IFFT of this modified OFDM block.

Figure 11A:
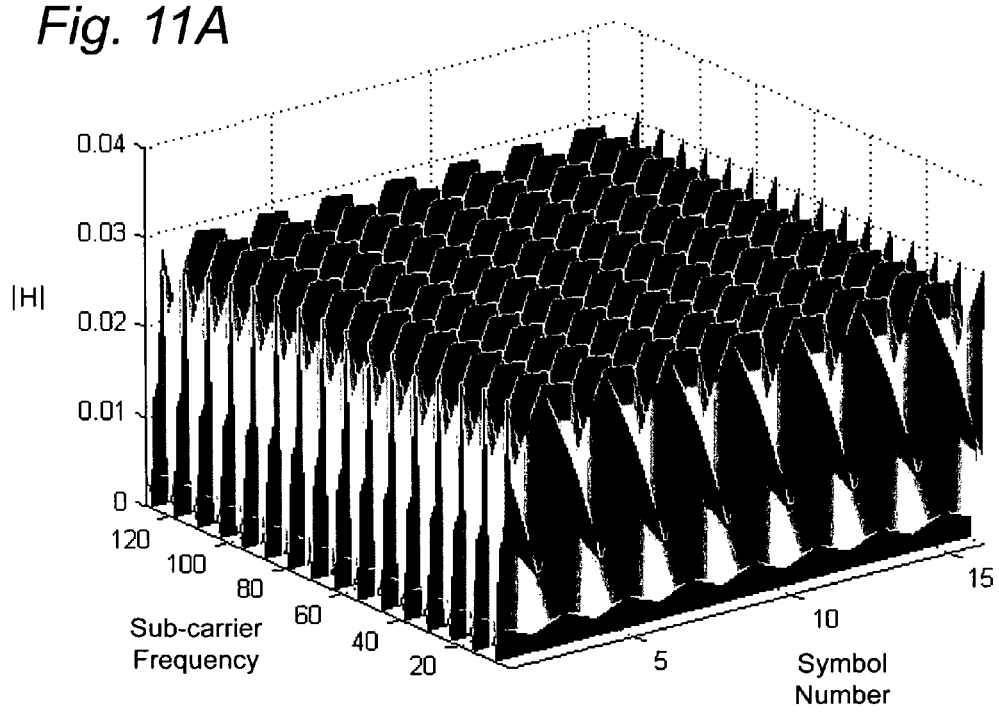
FIGS. 11A-11C include a three dimensional graph of a non-limiting example channel impulse response (IR) of the channel using the channel IR of the pilot symbols and inserting zeros in the remaining data symbol positions, a slice of an OFDM symbol corresponding to antenna A1, and another slice for the first the sub-carrier in the OFDM symbol dimension.
Figure 11B:
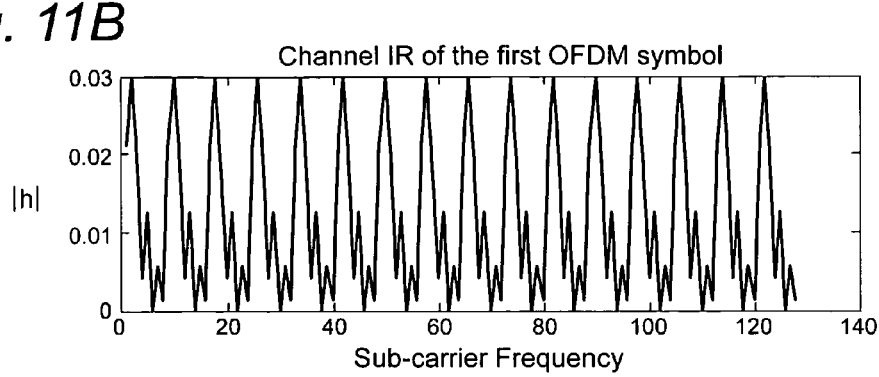
Figure 11C:
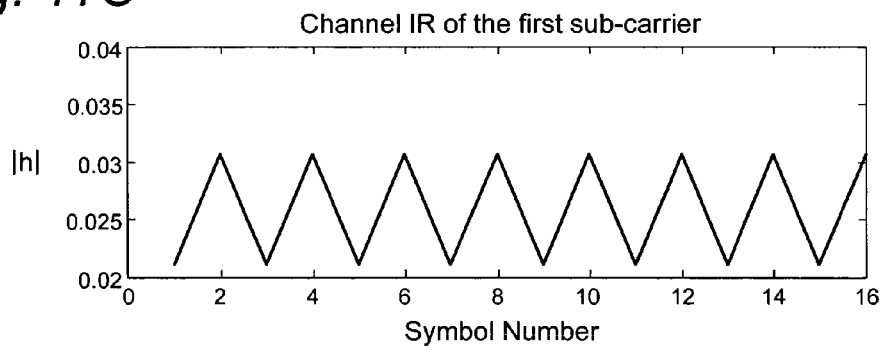

The 2D-IFFT results are illustrated in FIGS. 11A-11C. FIG. 11A shows that the channel impulse response is periodic producing a number of copies of the channel impulse response corresponding to the number of zeroes inserted between two adjacent pilots. Only one copy of the channel is required to obtain the final channel estimate. The copy may be selected using a low pass filter which selects the first portion of the data and ignore the sub-sequent repeated versions of it. FIG. 11B illustrates a "slice" of the first of the OFDM symbols (corresponding to Antenna A1) taken from the three dimensional channel impulse response shown in FIG. 11A. The channel impulse response for each antenna is periodic with the periodicity corresponding to the number of zeros inserted between the sub-carrier frequencies (15 for this example). FIG. 11C is another slice of the first sub-carrier frequency dimension which corresponds to all the OFDM symbols. The channel impulse response for all antennas (A2 and A1) is periodic, with the period determined by the number of zeros inserted between the OFDM symbols (7 for this example).

Figure 12:
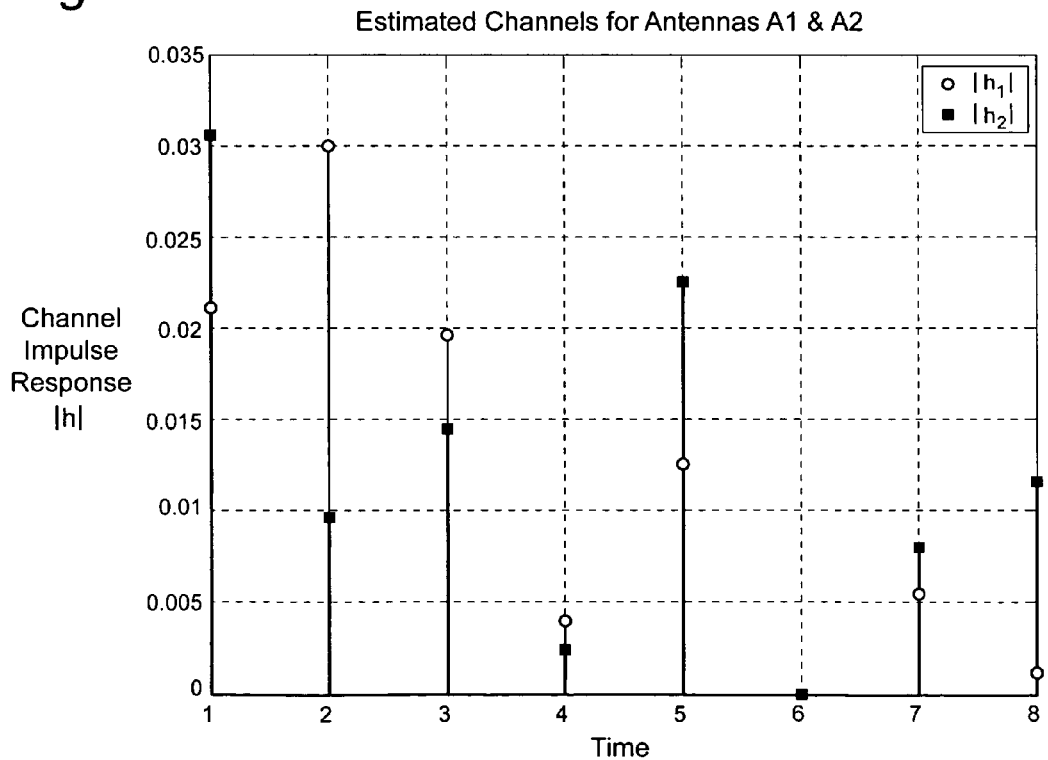
FIG. 12 is a graph showing the recovered channel estimate recovered for each antenna by calculating a two dimensional Fourier transform of one of the copies shown in FIG. 11.

A two-dimensional FFT is then performed on the selected copy and results in the channel impulse response for both antennas in the time domain as illustrated in FIG. 12. Comparison between FIG. 12 and FIG. 8 reveals that the two graphs are the same. Thus, the above technique estimates the channel for all points of the OFDM symbol block without performing the linear interpolation between the pilot symbols. Because FIGS. 8 and 12 match identically, the accuracy of this technique is readily apparent.

The above description may be supported mathematically. Let B be a block of coded OFDM symbols of size N×M at the input of the 2D-IFFT block in FIG. 6. The output of the 2D-IFFT is denoted by S. The signal S is then subject to linear operations and transmitted on a number of antennas $A_x$ as explained earlier, i.e., the columns of S are selected in a cyclic fashion and transmitted onto the physical antennas. Let $s=[s_1 \, s_2 \ldots s_M]$, where $s_k$ corresponds to the kth OFDM symbol of S. Let $Y=[y_1 \, y_2 \ldots y_M]$ be the received signal at the receiver, e.g., a mobile station, where $y_k$ corresponds to the kth received OFDM symbol. As demonstrated below, a 2D-FFT of Y is given by:

$$\tilde{Y} = \sqrt{NM}\tilde{H}\cdot\tilde{S} = \sqrt{NM}\tilde{H}\cdot B \qquad (1)$$

where $\tilde{H}$ and $\tilde{S}$, denote the 2-Dimensional Fast Fourier Transforms (FFTs) of the channel matrix H and the block of data S, respectively, and B is the block of OFDM symbols. The term $\tilde{H}\cdot\tilde{S}$ denotes the element-wise multiplication of $\tilde{H}$ and $\tilde{S}$. Because the known pilots are equally placed in frequency (and time) in $\tilde{S}$, and because the number of pilots is greater than the length of the channel impulse response (IR) and number of transmit antennas so that the Nyquist criteria in frequency and time are satisfied, the columns and rows of H are completely recoverable from the pilot samples. See, for example, Oppenheim et al, *Discrete-Time Signal Processing*, p. 558, Prentice Hall, second edition, 1999.

This can be demonstrated in the following example. Assume N is equal to 4, M is equal to 2, and two transmit antennas A1 and A2 are used. B is a block of OFDM symbols of size 4×2 corresponding to:

$$B = \begin{bmatrix} 1 & -1 \\ 1 & -1 \\ -1 & 1 \\ -1 & -1 \end{bmatrix}.$$

Then S, the 2-dimensional IFFT of the block of symbols B, is equal to:

$$S = [s_1 \, s_2] = \frac{1}{\sqrt{2}} \begin{bmatrix} -1 & 1 \\ i & 2+i \\ 1 & -1 \\ -i & 2-i \end{bmatrix}.$$

Assume that the channel matrix H includes the following randomly selected values:

$$H = \frac{1}{\sqrt{2}} \begin{bmatrix} 6 & 2 \\ 8 & 2 \\ 9 & -10 \\ -10 & -7 \end{bmatrix}.$$

The first and the second columns of H correspond to the channel impulse response from the first and the second transmit antennas, respectively.

At the first transmission time instant $t_1$, OFDM symbol $s_1$ is transmitted from the transmit antenna A1, and OFDM symbol $s_2$ is transmitted from transmit antenna A2. At the next transmission time instant $t_2$, OFDM symbol $s_2$ is transmitted from transmission antenna A1 and OFDM symbol $s_1$ is transmitted from antenna A2. At the receiver, the received signal corresponding to the first and second OFDM symbols can be written as:

$$y_1 = H_1 s_1 + H_2 s_2 \text{ and } y_2 = H_1 s_2 + H_2 s_1,$$

where $$H_1 = \begin{bmatrix} 6 & -10 & 9 & 8 \\ 8 & 6 & -10 & 9 \\ 9 & 8 & 6 & -10 \\ -10 & 9 & 8 & 6 \end{bmatrix} \text{ and } H_2 = \begin{bmatrix} 2 & -7 & -10 & 2 \\ 2 & 2 & -7 & -10 \\ -10 & 2 & 2 & -7 \\ -7 & -10 & 2 & 2 \end{bmatrix}$$

are the channel matrices corresponding to channel impulse responses $h_1$ and $h_2$, respectively, (again the values for $H_1$ and $H_2$ are selected randomly for this example). Replacing the channel matrices and the transmit OFDM symbols by their respective values, the received signals at the receiver are given $$\text{by } y_1 = \frac{1}{\sqrt{2}} \begin{bmatrix} 5 - 27i \\ -25 + 9i \\ -25 + 27i \\ -7 - 9i \end{bmatrix} \text{ and } y_2 = \frac{1}{\sqrt{2}} \begin{bmatrix} -19 - 27i \\ 39 + 9i \\ 11 + 27i \\ 21 - 9i \end{bmatrix}.$$

The 2-D FFT of $Y=[y_1 \, y_2]$ produces $$\tilde{Y} = \begin{bmatrix} 0 & -26 \\ 9 - 27i & 15 + 9i \\ -14 & 20 \\ -9 - 27i & 15 - 9i \end{bmatrix}.$$

Working from equation (1) above, and given that the 2-D FFT of H is $$\tilde{H} = \frac{1}{2\sqrt{2}} \begin{bmatrix} 0 & 26 \\ 9 - 27i & -15 - 9i \\ 14 & 20 \\ +9 + 27i & -15 + 9i \end{bmatrix},$$

$$\sqrt{NM} = \sqrt{8} = 2\sqrt{2}, \text{ and } B = \begin{bmatrix} 1 & -1 \\ 1 & -1 \\ -1 & 1 \\ -1 & -1 \end{bmatrix},$$

the product $\sqrt{NM}\tilde{H}\cdot B$ is:

$$\sqrt{NM}\,\tilde{H}\cdot B =$$

$$2\sqrt{2} \frac{1}{2\sqrt{2}} \begin{bmatrix} 0 & 26 \\ 9 - 27i & -15 - 9i \\ 14 & 20 \\ +9 + 27i & -15 + 9i \end{bmatrix} \cdot \begin{bmatrix} 1 & -1 \\ 1 & -1 \\ -1 & 1 \\ -1 & -1 \end{bmatrix} = \begin{bmatrix} 0 & -26 \\ 9 - 27i & 15 + 9i \\ -14 & 20 \\ -9 - 27i & 15 - 9i \end{bmatrix}$$

which is identical to $\tilde{Y}$ noted above. The above example can be easily shown to hold for any value of N and M.

The above-described channel estimation technique has many advantages. Conventional MIMO OFDM technology requires transmission of significant "overhead" information which reduces throughput. In the approach described above, there is no need to associate a unique pilot to each transmit antenna. Nor does the receiver need to know the number of transmit antennas. So neither piece of overhead information needs to be sent over the wireless channel. Another advantage is that the channel is accurately estimated at the borders of the time-frequency grid. Moreover, and in contrast to channel estimation techniques like linear MMSE, the present channel estimation approach needs only relatively small amounts of memory and is substantially less computationally complex.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for use in a transmitter having multiple antennas in a OFDM-based radio communications system, comprising:
   determining one or more known pilot symbols;
   determining a periodic pilot transmission pattern;
   forming a block of OFDM symbols that includes the one or more pilot symbols and data symbols in accordance with a predetermined pattern;
   using a space-time coder to perform space and time coding by assigning certain ones of the OFDM symbols to be transmitted during a particular time slot from a selected one of the multiple antennas; and
   transmitting OFDM symbols from the antennas,
   wherein the space-time coder provides a first block of multiple OFDM symbols in a first sequential order to a first antenna for transmission during a number of time slots and a second block of the same multiple OFDM symbols in a second sequential order different from the first sequential order to a second antenna for transmission during the number of time slots.

2. The method in claim 1, further comprising:
   prior to transmitting, adding a cyclic prefix to each block of OFDM symbols.

3. The method in claim 1, wherein the predetermined pattern is a symmetric pattern.

4. The method in claim 1, wherein the predetermined pattern is not symmetric, the method further comprises:
   transforming the predetermined pattern into a symmetric pattern where the pilot symbols are interspersed symmetrically with the data symbols in the OFDM symbol block.

5. The method in claim 1, wherein the predetermined pattern is such that the pilot symbols are transmitted at periodic times on periodic sub-carriers.

6. The method in claim 1, wherein the second sequential order is a cyclically shifted version of the first sequential order.

7. The method in claim 1, wherein during a first time slot, providing a first symbol from the first block in the first sequential order and a first symbol from the second block in the second sequential order to the first antenna and the second antenna for transmission, respectively, and during a second subsequent time slot, providing a second symbol from the first block in the first sequential order and a second symbol from the second block in the second sequential order to the first antenna and the second antenna for transmission, respectively.

8. Apparatus for use in a transmitter in a OFDM-based radio communications system, comprising:
   multiple antennas;
   electronic circuitry configured to:
      determine one or more known pilot symbols;
      determine a periodic pilot transmission pattern;
      form a block of OFDM symbols that includes the one or more pilot symbols and data symbols in accordance with a predetermined pattern;
      perform space-time coding by assigning certain ones of the OFDM symbols to be transmitted during a particular time slot from a selected one of the multiple antennas; and
   a transmitter, coupled to the electronic circuitry, for transmitting OFDM symbols from the antennas,
   wherein the electronic circuitry is configured to perform the space-time coding to provide a first block of multiple OFDM symbols in a first sequential order to a first antenna for transmission during a number of time slots and a second block of the same multiple OFDM symbols in a second sequential order different from the first sequential order to a second antenna for transmission during the number of time slots.

9. The apparatus in claim 8, wherein the electronic circuitry is configured to add a cyclic prefix to each block of OFDM symbols prior to transmission.

10. The apparatus in claim 8, wherein the predetermined pattern is a symmetric pattern.

11. The apparatus in claim 8, wherein when the predetermined pattern is not symmetric, the electronic circuitry is configured to transform the predetermined pattern into a symmetric pattern where the pilot symbols are interspersed symmetrically with the data symbols in the OFDM symbol block.

12. The apparatus in claim 8, wherein the predetermined pattern is such that the pilot symbols are transmitted at periodic times on periodic sub-carriers.

13. The apparatus in claim 8, wherein the second sequential order is a cyclically shifted version of the first sequential order.

14. The apparatus in claim 8, wherein during a first time slot, the electronic circuitry is configured to provide a first symbol from the first block in the first sequential order and a first symbol from the second block in the second sequential order to the first antenna and the second antenna for transmission, respectively, and during a second subsequent time slot, the electronic circuitry is configured to provide a second symbol from the first block in the first sequential order and a second symbol from the second block in the second sequential order to the first antenna and the second antenna for transmission, respectively.

* * * * *